(12) United States Patent
Lindholm

(10) Patent No.: US 8,550,100 B1
(45) Date of Patent: *Oct. 8, 2013

(54) PORTABLE ICE FISHING SHELTER

(76) Inventor: Michael Thomas Lindholm, Thief River Falls, MN (US)

(*) Notice: Subject to any disclaimer, the term of this patent is extended or adjusted under 35 U.S.C. 154(b) by 0 days.

This patent is subject to a terminal disclaimer.

(21) Appl. No.: 13/467,232

(22) Filed: May 9, 2012

Related U.S. Application Data

(63) Continuation of application No. 12/633,841, filed on Dec. 9, 2009, now Pat. No. 8,191,564.

(51) Int. Cl.
*E04H 15/06* (2006.01)
*B60P 3/34* (2006.01)

(52) U.S. Cl.
USPC ....... 135/96; 135/88.13; 135/901; 296/26.13; 296/173

(58) Field of Classification Search
USPC ............ 135/87, 88.13, 88.17–88.18, 96, 116, 135/144, 148, 151, 901, 88.1; 52/169.12, 52/143, 79.5, 71–72, 67–68; 296/26.01, 296/6.12–26.15, 161, 165, 168, 171, 173, 296/175; 280/19.1, 20, 400–401, 406.2
See application file for complete search history.

(56) References Cited

U.S. PATENT DOCUMENTS

| | | | |
|---|---|---|---|
| 3,157,185 A | 11/1964 | Schoenike |
| 3,507,293 A | 4/1970 | Du Bray |
| 3,923,335 A | 12/1975 | Erickson |
| 4,239,247 A | 12/1980 | Hinz |
| 4,438,940 A | 3/1984 | Hunt |
| 4,465,316 A | 8/1984 | Roisen |
| 4,741,133 A | 5/1988 | Kutzner |
| 4,912,892 A | 4/1990 | Jurgensen |
| 4,926,893 A | 5/1990 | Klopfenstein |
| 5,341,588 A | 8/1994 | Lizotte |
| 5,368,057 A | 11/1994 | Lubkeman |
| 5,622,198 A | 4/1997 | Elsinger |
| 5,749,387 A | 5/1998 | Thompson |
| 5,918,890 A | 7/1999 | Willems |
| 5,971,471 A | 10/1999 | Gardner |
| 6,354,646 B1 | 3/2002 | McManus |
| 6,397,870 B1 | 6/2002 | Makedonsky |
| 6,962,221 B1 | 11/2005 | Carrette |
| 7,681,941 B2 | 3/2010 | Freeman |
| 2002/0084123 A1 | 7/2002 | Farsdale |
| 2006/0162755 A1 | 7/2006 | Platek |
| 2010/0276964 A1 | 11/2010 | Nelson |

FOREIGN PATENT DOCUMENTS

GB 2068848 8/1981

*Primary Examiner* — Winnie Yip
(74) *Attorney, Agent, or Firm* — Jason L. Gilbert

(57) ABSTRACT

A portable ice fishing shelter for providing an enclosed and expandable structure for ice fishing within. The ice fishing shelter generally includes a rigid primary enclosure having sidewalls, a roof, and a base to form a first interior space, wherein the base forms an inverted U-shaped raised center portion to accommodate a seat within and allow for smoother pulling below. The primary enclosure also has a side opening extending through at least one of the sidewalls for a rigid extendable enclosure. The extendable enclosure includes an open bottom and extends from a perimeter of the side opening and is movably connected thereto. The extendable enclosure is adapted to move between a refracted position during storage or transport and an extended position during use, wherein a second interior space is formed to accommodate one or more angling holes. A tow hitch and glide members may also extend from the primary enclosure.

16 Claims, 7 Drawing Sheets

PORTABLE ICE FISHING SHELTER

CROSS REFERENCE TO RELATED APPLICATIONS

I hereby claim benefit under Title 35, United States Code, Section 120 of U.S. patent application Ser. No. 12/633,841 filed Dec. 9, 2009. This application is a continuation of the Ser. No. 12/633,841 application. The Ser. No. 12/633,841 application is currently pending. The Ser. No. 12/633,841 application is hereby incorporated by reference into this application.

STATEMENT REGARDING FEDERALLY SPONSORED RESEARCH OR DEVELOPMENT

Not applicable to this application.

BACKGROUND OF THE INVENTION

1. Field of the Invention

The present invention relates generally to a fish house and more specifically it relates to a portable ice fishing shelter for efficiently providing an expandable structure to be enclosed within while ice fishing.

2. Description of the Related Art

Any discussion of the related art throughout the specification should in no way be considered as an admission that such related art is widely known or forms part of common general knowledge in the field.

Fish houses or shelters have been in use for years and are typically manufactured in various sizes and shapes. Ice fishing shelters may be manufactured as a portable structure or a permanent structure. Many portable ice fishing shelters have a tarp or fabric outer layers, which can be easily prone to tearing especially when exposed to below freezing temperatures. It can be difficult to repair the tears, which often results in air leaking through the repaired fabric and/or the resale value of the fishing shelter substantially decreasing.

Many other problems exist with prior portable ice fishing shelters, such as being overweight and difficult to transport on and off the ice, not being wind resistant, and various others. Because of the inherent problems with the related art, there is a need for a new and improved portable ice fishing shelter for efficiently providing an expandable structure to be enclosed within while ice fishing.

BRIEF SUMMARY OF THE INVENTION

A system for efficiently providing an expandable structure to be enclosed within while ice fishing. The invention generally relates to a fish house which includes a rigid primary enclosure having sidewalls, a roof, and a base to form a first interior space, wherein the base forms an inverted U-shaped raised center portion to accommodate a seat within and allow for smoother pulling below. The primary enclosure also has a side opening extending through at least one of the sidewalls for a rigid extendable enclosure. The extendable enclosure includes an open bottom and extends from a perimeter of the side opening and is movably connected thereto. The extendable enclosure is adapted to move between a retracted position during storage or transport and an extended position during use, wherein a second interior space is formed to accommodate one or more angling holes. A tow hitch and glide members may also extend from the primary enclosure.

There has thus been outlined, rather broadly, some of the features of the invention in order that the detailed description thereof may be better understood, and in order that the present contribution to the art may be better appreciated. There are additional features of the invention that will be described hereinafter and that will form the subject matter of the claims appended hereto. In this respect, before explaining at least one embodiment of the invention in detail, it is to be understood that the invention is not limited in its application to the details of construction or to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein.

DETAILED DESCRIPTION OF THE INVENTION

A. Overview.

Figure 1:
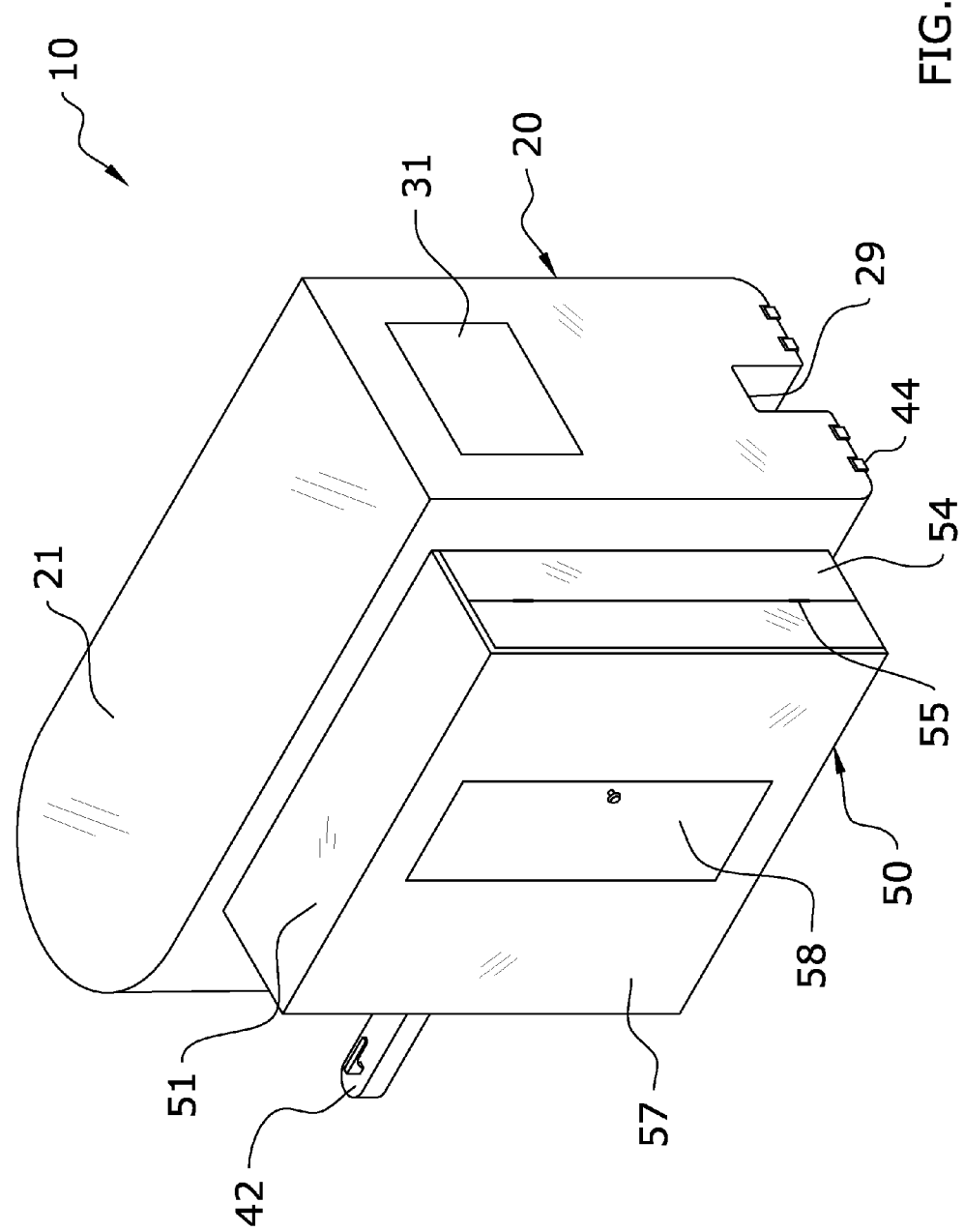
FIG. 1 is an upper perspective view of the present invention.
Figure 2:
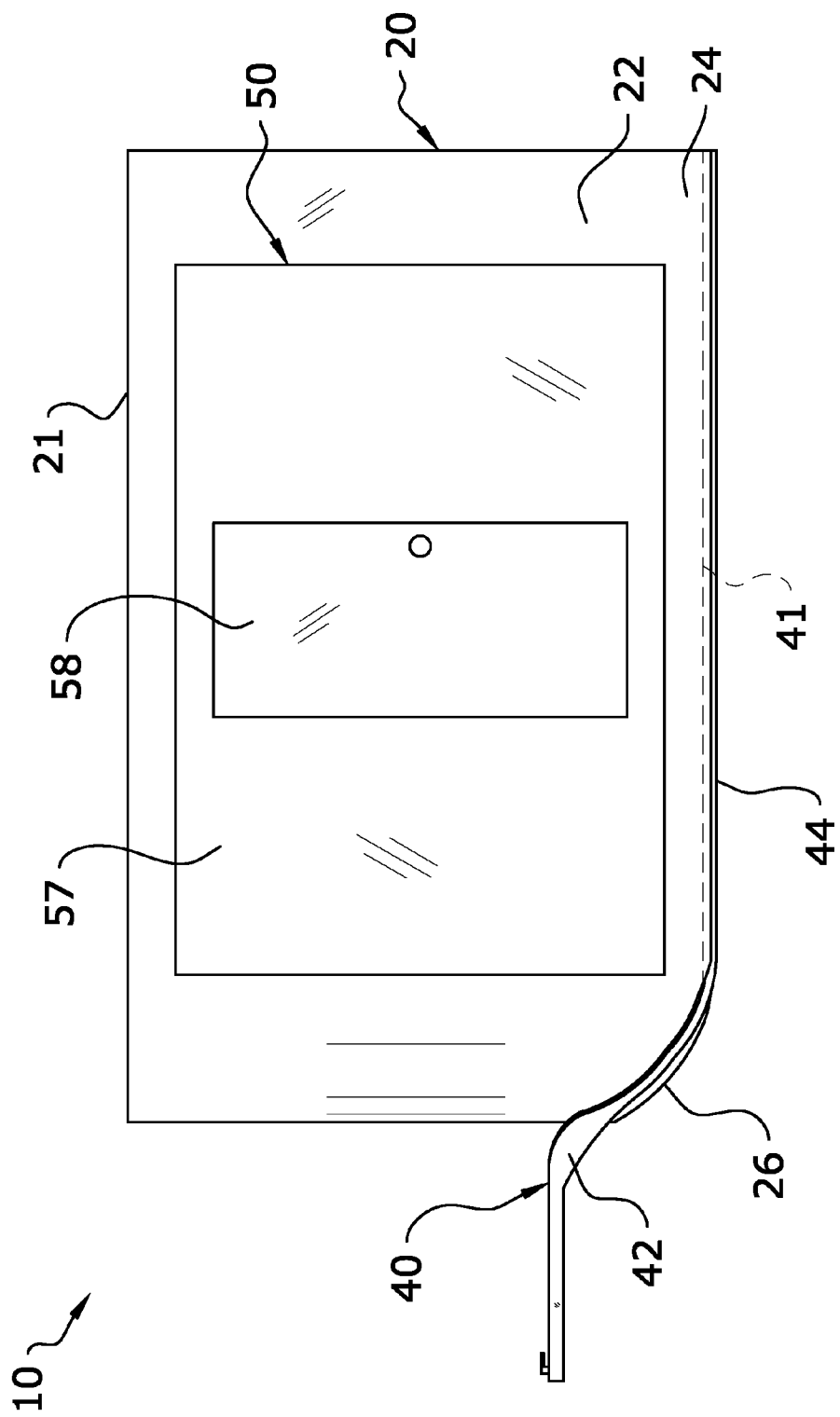
FIG. 2 is a side view of the present invention.
Figure 3:
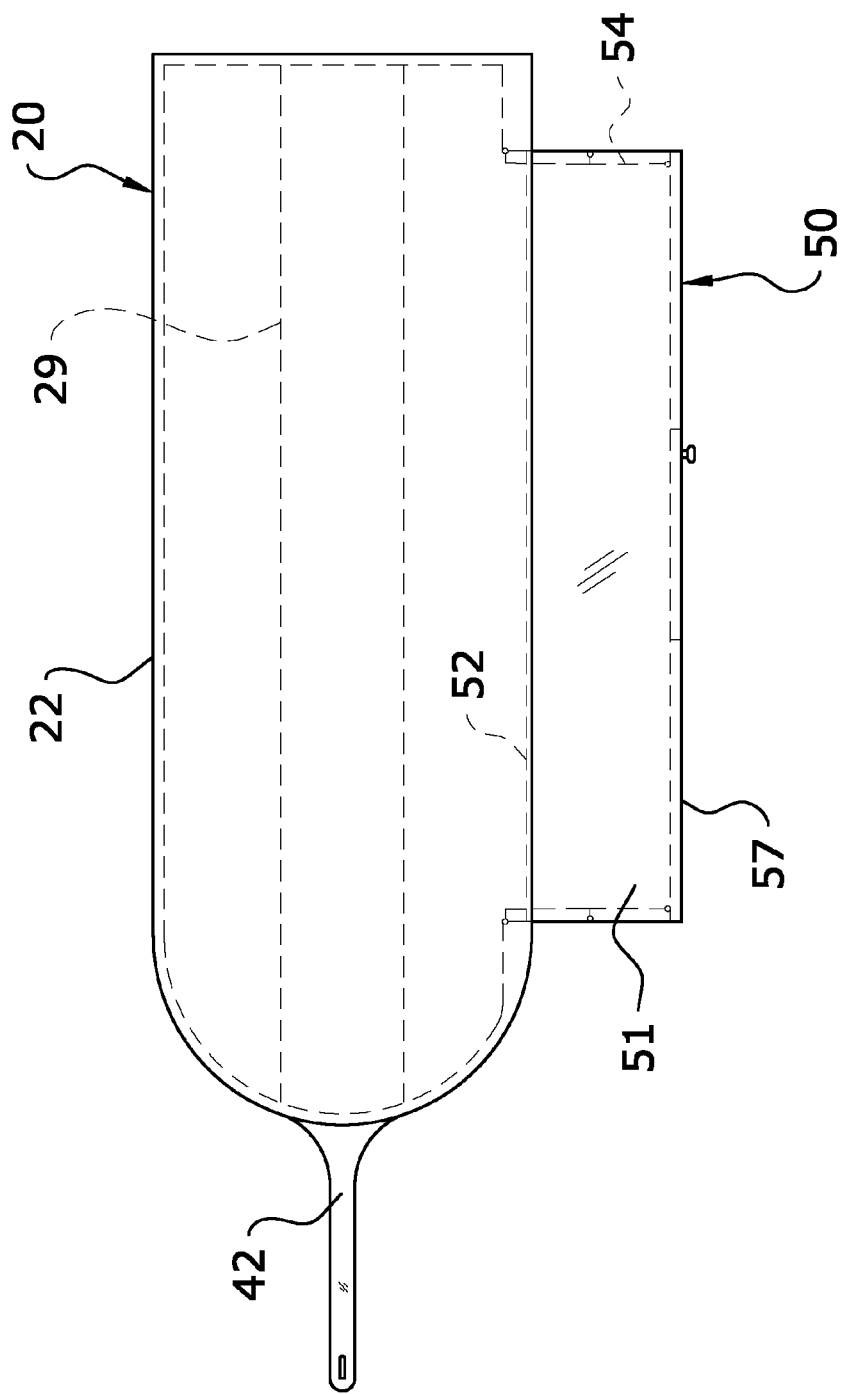
FIG. 3 is a top view of the present invention with the extendable enclosure fully extended outwards.
Figure 4:
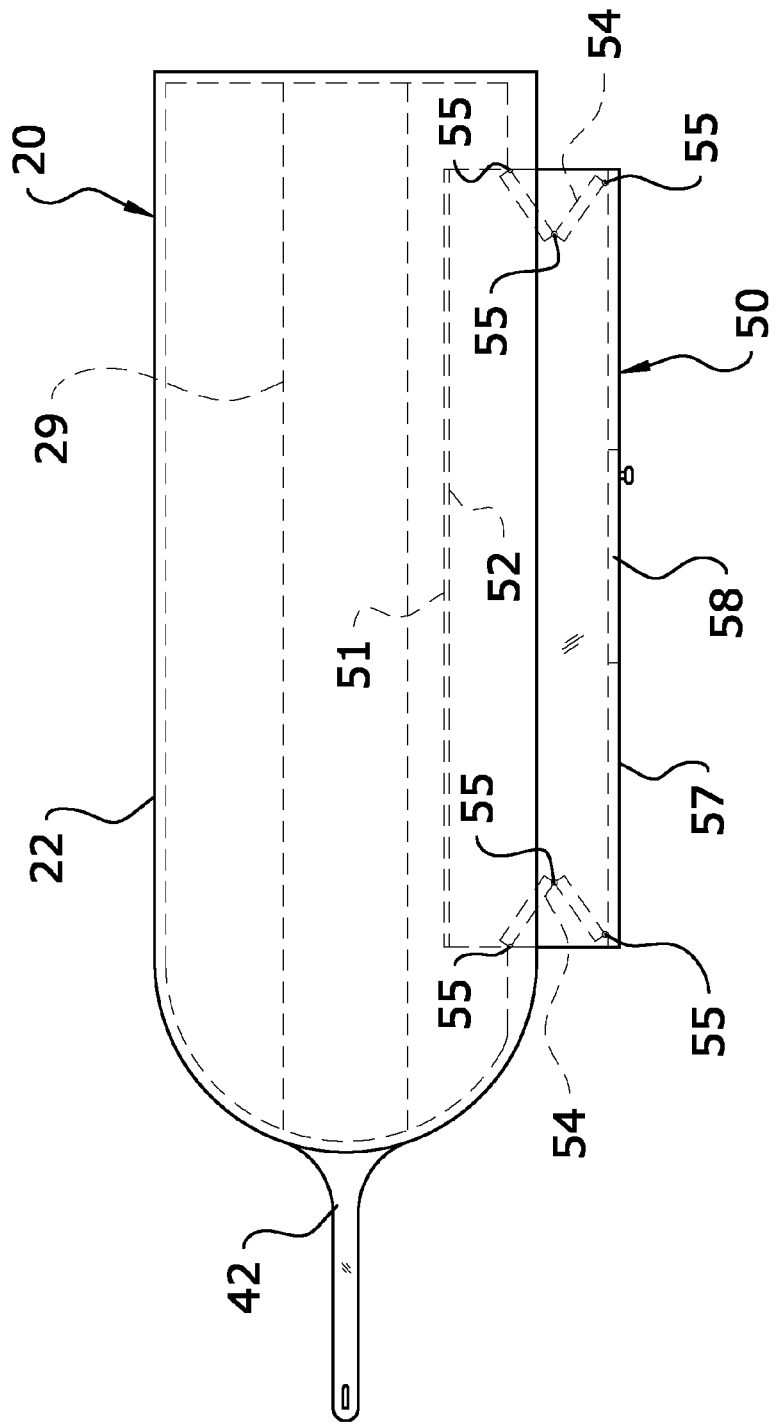
FIG. 4 is a top view of the present invention with the extendable enclosure partially retracted inwards.
Figure 5:
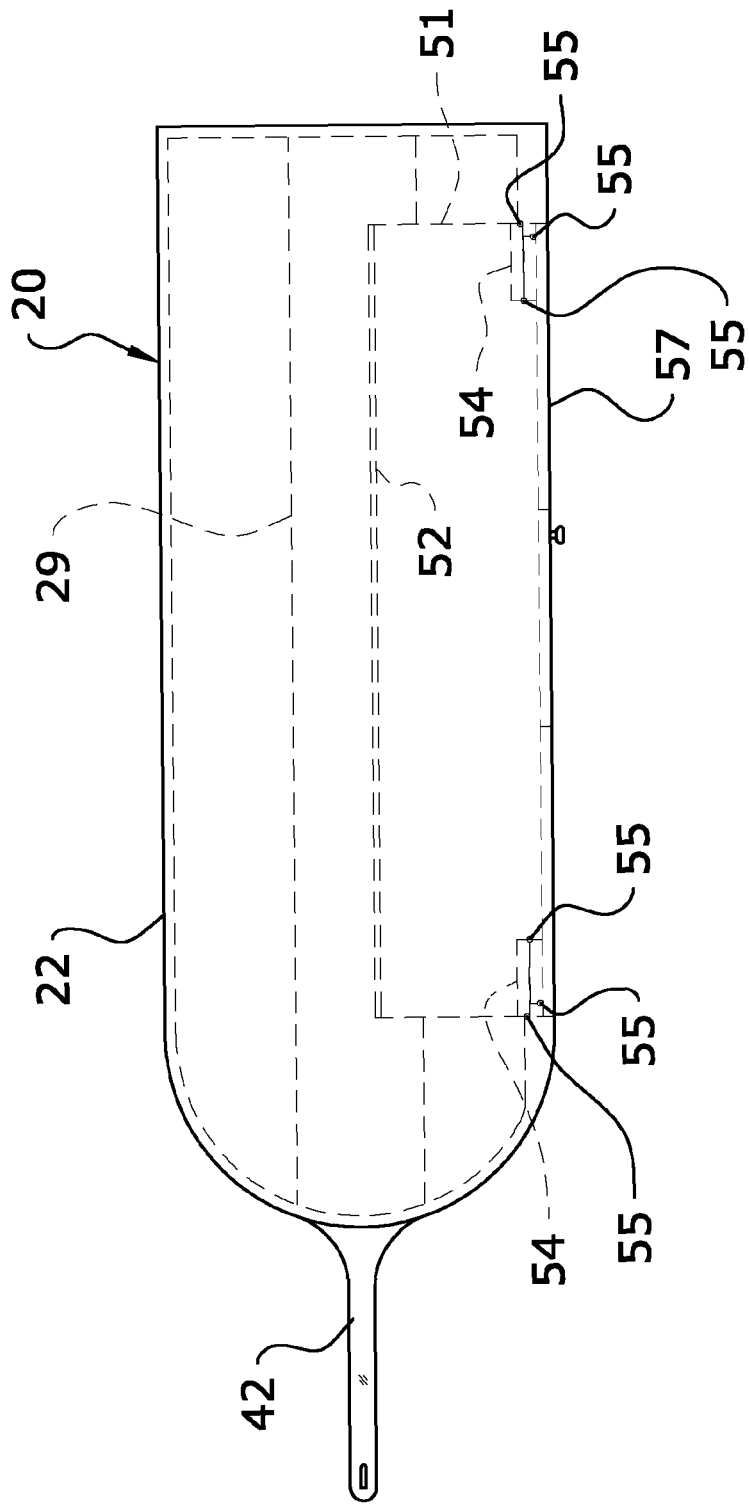
FIG. 5 is a top view of the present invention with the extendable enclosure fully retracted.
Figure 6:
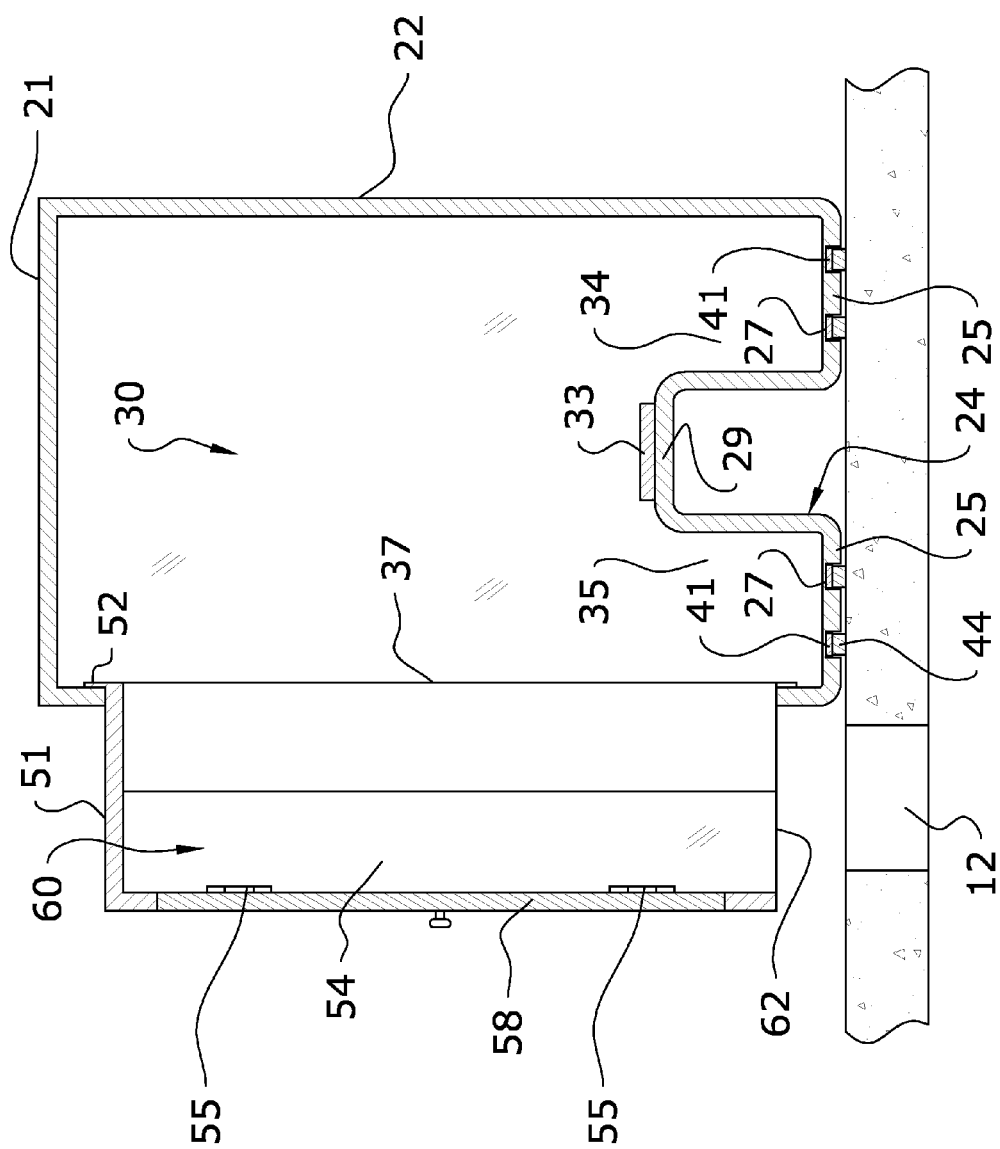
FIG. 6 is a cross-sectional view of the present invention with the extendable enclosure fully extended outwards.
Figure 7:
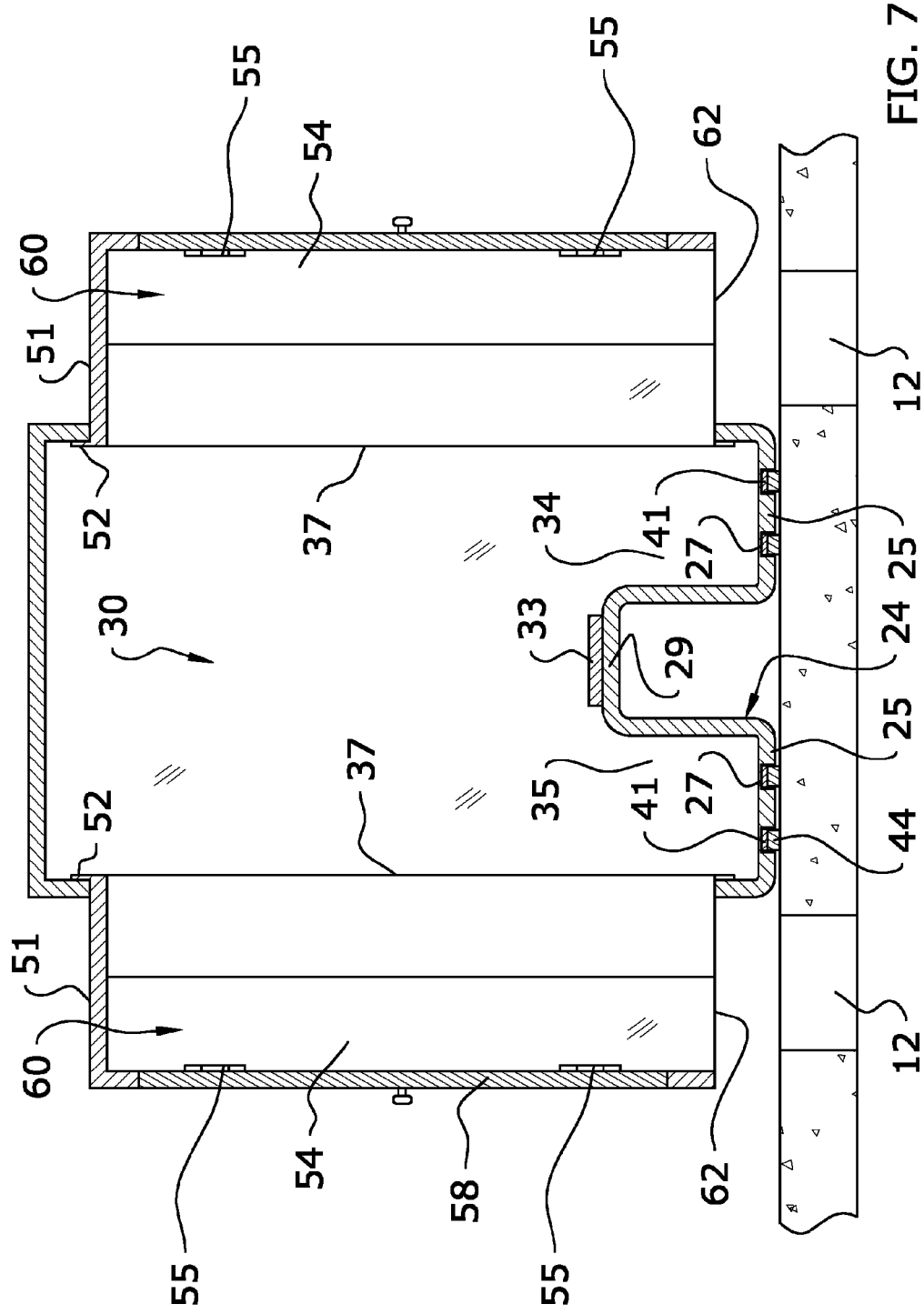
FIG. 7 is a cross-sectional view of an alternate embodiment of the present invention with a pair of extendable enclosures fully extended outwards.

Turning now descriptively to the drawings, in which similar reference characters denote similar elements throughout the several views, FIGS. 1 through 7 illustrate a portable ice fishing shelter 10, which comprises a rigid primary enclosure 20 having sidewalls 22, a roof 21, and a base 24 to form a first interior space 30, wherein the base 24 forms an inverted U-shaped raised center portion 29 between a pair of runners 25 to accommodate a seat 33 within and allow for smoother pulling below. The primary enclosure 20 also has a side opening 37 extending through at least one of the sidewalls 22 for a rigid extendable enclosure 50. The extendable enclosure 50 includes an open bottom 62 and extends from a perimeter of the side opening 37 and is movably connected thereto.

The extendable enclosure 50 is adapted to move between a retracted position during storage or transport and an extended position during use, wherein a second interior space 60 is formed to accommodate one or more angling holes 12. A tow hitch 42 and slide members 44 may also extend from the primary enclosure 20 for pulling or towing purposes. The primary enclosure 20 and the extendable enclosure(s) 50 are also preferably insulated.

B. Primary Enclosure.

The primary enclosure 20 generally includes the interior space 30 in which the user is seated within and is the structure that is used to support the extendable enclosure(s) 50 extending therefrom. The primary enclosure 20 is generally comprised of a rigid structure. The primary enclosure 20 is further preferably comprised of a lightweight (for easy transporting) and floatable (in the case of ice breakage) material, such as but not limited to plastic.

The primary enclosure 20 also generally includes a roof 21, sidewalls 22, and a base 24 to form a substantially complete enclosed structure. The roof 21, sidewalls 22, and base 24 may be comprised of separate components or may integrally formed. The primary enclosure 20 is generally of a height to allow an individual to stand up within the defined interior space 30 of the primary enclosure 20 and is large enough to accommodate the individual's fishing gear within. The primary enclosure 20 may further be comprised of various sizes to accommodate various numbers of fishermen.

The sidewalls 22 may also include windows 31, vents, and various other structures. In addition, one or more of the lengthwise sidewalls 22 includes a side opening 37 extending therethrough perpendicularly oriented to the seat 33 and thus longitudinal axis of the primary enclosure 20. The side opening 37 is preferably large enough for one or more fishermen to comfortably extend their fishing rods through, feet through, etc. to access and view angling holes 12 positioned on the other side of the side opening 37. Each side opening 37 receives the extendable enclosure 50, which will be described in more detail in the next section.

The base 24 generally includes a pair of runners 25 spaced along each of the sides from a front to a rear end of the primary enclosure 20 and a raised center portion 29 between the runners 25. The raised center portion 29 serves various purposes, such as reducing the engaging surface area with the snow or ice surface to allow for easier towing, to reduce the likelihood of engaging snow chunks, ice chunks, and other debris, by providing an open space between the runners 25, and to provide a support for a seat 33 positioned within the interior space 30 of the primary enclosure 20.

It is appreciated that the seat 33 and center raised portion 29 may be comprised of various widths, such as depending on whether a side opening 37 and extendable enclosure 50 is positioned on each side of the fishing shelter 10 which generally mandates different individuals to sit substantially back-to-back upon the seat(s) 33 to face a direction toward a respective angling hole 12 in either a first extendable enclosure 50 on a first side or a second extendable enclosure 50 on a second side of the primary enclosure 20. Thus, a wider seat 33 and center raised portion 29 is generally required for multiple extendable enclosures 50.

One or more seats 33, comprised of bench-style seats, bucket-style seats, etc. are generally affixed to the raised center portion 29 in the interior space 30 of the primary enclosure 20 for sitting thereupon. Further, a first lower space 34 and a second lower space 35 are generally formed on the interior side of the runners 25. The first lower space 34 and the second lower space 35 may be used for placing an individual's feet (when sitting upon the seat 33), positioning fishing gear, etc.

Each of the runners 25 also generally include a tapered front end 26 for allowing a more smooth towing of the primary enclosure 20 by allowing for a smoother transition between uneven surfaces. Each of the runners 25 further preferably include longitudinal channels 27 extending within the runners 25 to at least partially receive the attachment structure 40 and the slide members 44.

The attachment structure 40 is generally comprised of a metal material and extends within the channels 27 via a base portion 41 and extends forwardly therefrom to form a hitch portion 42. The base portion 41 and the tow hitch portion 42 are preferably connected to better evenly distribute the weight of the primary enclosure 20 when being towed via the tow hitch portion 42. Various types of tow hitches may be utilized with the tow hitch portion 42. The base portion 41 also preferably extends the entire length of the base 24 of the primary enclosure 20 from a front end to a rear end for maximum distribution of weight.

Slides 44, generally of a Hyfax-type, are attached to the bottom of the base portion 41 of the attachment structure 40 opposite the base 24 to engage a ground surface and facilitate easier sliding of the primary enclosure 20 across snow and ice. Various other ground engaging means may alternately be utilized, such as skis, grooves in the bottom of the base 24, ridges extending from the bottom of the base 24, etc.

C. Extendable Enclosures.

The present invention includes one or more extendable enclosures 50 depending on the size of the fishing shelter 10 and the number of individuals the fishing shelter 10 is meant accommodate. Each extendable enclosure 50 is meant to retract and extend from the primary enclosure 20 on a respective side of the primary enclosure 20. The extendable enclosure 50 is retracted inwardly towards the primary enclosure 20 during transport and storage to provide a more arrow-dynamic, maneuverable, and smaller-width structure and the extendable enclosure 50 is extended outwards to form a second interior space 60 to accommodate the angling holes 12, rods, heater, etc. during use of the fishing shelter 10.

The extendable enclosure 50 is generally comprised of a rigid structure. The extendable structure is further preferably comprised of a lightweight (for easy transporting) and floatable (in the case of ice breakage) material, such as but not limited to plastic similar to the primary enclosure 20.

The extendable enclosure 50 generally includes side panels 54, a front panel 57, a top panel 51, and a substantially open bottom 62 (may include some bottom structure, as long as adequate space is provided for angling holes 12 therethrough or may be completely open). The extendable enclosure 50 preferably includes a bi-fold door structure for the side panels 54, wherein the side panels 54 fold inwardly when moving between the refracted and extended positions. The side panels 54 include hinges 55 in place at each end and the center of the bi-fold door structure.

The front panel 57 is attached at an outer end of the side panels 54 and may include a door 58 extending therethrough for accessing the interior space 60 of the primary enclosure 20 and/or extendable enclosure 50. It is appreciated that the primary enclosure 20 is directly accessible through the door 58 when the extendable enclosure 50 is in the refracted position and the extendable enclosure 50 is directly accessible through the door 58 when the extendable enclosure 50 is in the extended position. It is also appreciated that the door 58 may be positioned at various locations upon the primary enclosure 20 and/or extendable enclosure 50 in alternate embodiments. Additional doors may also be utilized.

The top panel 51 of the extendable enclosure 50 preferably slides straight within the primary enclosure 20 in the refracted position. The top panel 51 may include a lip 52 extending vertically upward on an inner most edge for sealing any gap formed between the top panel 51 and the primary enclosure 20 through the side opening 37.

D. Operation of Preferred Embodiment.

In use, the fishing shelter 10 is attached to a tow vehicle (e.g. ATV, snowmobile, etc.) and towed to a fishing location. Once at the fishing location, snow or other debris is generally cleared away and the side opening(s) 37 is positioned adjacent to where the angling holes 12 are to be drilled. The angling holes 12 are drilled and the extendable enclosures 50 may be extended outwardly from the primary enclosure 20 so that the side panels 54 of the extendable enclosure 50 are distally spaced from the sidewalls 22 of the primary enclosure 20 and preferably substantially perpendicular with the sidewalls 22 to define the second interior space 60 around the angling holes 12.

The individual may then enter the fishing shelter 10 through the door 58 to immediately access the second space 60 and then enter the first space 30 through the side opening 37 to sit upon the seat 33. The individual generally faces the side opening 37 to view and access the angling holes 12 positioned within the second interior space 60.

When transporting the fishing shelter, the side panels 54 are folded inwards to retract the extendable enclosure 50 until the front panel 57 is proximally spaced and preferably substantially flush with the respective sidewall 22 of the primary enclosure 20. It is appreciated that the side panels 54 may extend inwardly within the interior space 30 of the primary enclosure 20 slightly when in the retracted position. Various locks or mechanisms may be used to retain the extendable enclosure 50 in either the extended position or the retracted position.

Unless otherwise defined, all technical and scientific terms used herein have the same meaning as commonly understood by one of ordinary skill in the art to which this invention belongs. Although methods and materials similar to or equivalent to those described herein can be used in the practice or testing of the present invention, suitable methods and materials are described above. All publications, patent applications, patents, and other references mentioned herein are incorporated by reference in their entirety to the extent allowed by applicable law and regulations. In case of conflict, the present specification, including definitions, will control. The present invention may be embodied in other specific forms without departing from the spirit or essential attributes thereof, and it is therefore desired that the present embodiment be considered in all respects as illustrative and not restrictive. Any headings utilized within the description are for convenience only and have no legal or limiting effect.

The invention claimed is:

1. A portable ice fishing shelter, comprising:
   a primary enclosure having sidewalls, a roof, and a base to form a first interior space, wherein said first interior space is adapted to substantially enclose at least one seat, wherein said base includes a first runner, a second runner, and a raised center portion formed therebetween, wherein said first and second runners and said raised center portion extending parallel to said sidewalls from a front end to a rear end of said primary enclosure;
   one or more seats affixed to said raised center portion;
   wherein said primary enclosure has a side opening extending through at least one of said sidewalls; and
   at least one extendable enclosure having side panels, a front panel, a top panel, and a substantially open bottom;
   wherein said first runner and said second runner define a first lower space positioned below said at least one seat and above said first runner within said first interior space and a second lower space positioned below said at least one seat and above said second runner within said first interior space.

2. The portable ice fishing shelter of claim 1, wherein said at least one extendable enclosure is comprised of a rigid structure.

3. The portable ice fishing shelter of claim 1, wherein said side panels of said at least one extendable enclosure are each comprised of a hinged bi-fold structure.

4. The portable ice fishing shelter of claim 1, wherein said at least one extendable enclosure includes a door.

5. The portable ice fishing shelter of claim 1, wherein said top panel includes a lip formed along an inner edge for sealing said side opening when said at least one extendable enclosure is positioned in said extended position.

6. The portable ice fishing shelter of claim 1, wherein said first runner and said second runner each have at least one ground engaging means extending therealong.

7. The portable ice fishing shelter of claim 6, wherein said ground engaging means is comprised of a slide member.

8. The portable ice fishing shelter of claim 1, including a tow hitch extending from said primary enclosure.

9. A portable ice fishing shelter, comprising:
   a primary enclosure having sidewalls, a roof, and a base to form a first interior space, wherein said first interior space is adapted to substantially enclose at least one seat, wherein said base includes a first runner, a second runner, and a raised center portion formed therebetween wherein said first and second runners and said raised center portion extending parallel to said sidewalls from a front end to a rear end of said primary enclosure;
   one or more seats affixed to said raised center portion;
   wherein said primary enclosure has a first side opening extending through at least one of said sidewalls; and
   a first extendable enclosure having side panels, a front panel, a top panel, and a substantially open bottom;
   wherein said first extendable enclosure extends from a substantial perimeter of said side opening of said primary enclosure and is movably connected with respect to said primary enclosure;
   wherein said first extendable enclosure is adapted to move between a retracted position and an extended position, said first extendable enclosure being adapted to retract inwardly towards said primary enclosure and to extend outwardly to form a second interior space;
   wherein said front panel is substantially flush with said at least one sidewall and over said side opening in said retracted position and wherein said front panel is distally spaced from said side opening in said extended position to form a second interior space within said first extendable enclosure;
   wherein second interior space is connected to said first interior space through said side opening;
   wherein said first runner and said second runner define a first lower space positioned below said at least one seat and above said first runner within said first interior space and a second lower space positioned below said at least one seat and above said second runner within said first interior space.

10. The portable ice fishing shelter of claim 9, including a second extendable enclosure extending from a perimeter of a second side opening of said primary enclosure, wherein said second side opening extends through an opposing sidewall as said first side opening.

11. The portable ice fishing shelter of claim 9, wherein said side panels of said at least one extendable enclosure are each comprised of a hinged bi-fold structure.

12. The portable ice fishing shelter of claim 9, wherein said at least one extendable enclosure includes a door.

13. The portable ice fishing shelter of claim 9, wherein said top panel includes a lip formed along an inner edge for sealing said side opening when said at least one extendable enclosure is positioned in said extended position.

14. The portable ice fishing shelter of claim 9, wherein said first runner and said second runner each have at least one ground engaging means extending therealong.

15. The portable ice fishing shelter of claim 9, including a tow hitch extending from said primary enclosure.

16. A portable ice fishing shelter, comprising:
- an primary enclosure having sidewalls, a roof, and a base to form a first interior space, wherein said first interior space is adapted to substantially enclose at least one seat;
- wherein said primary enclosure has a side opening extending through at least one of said sidewalls, wherein said side opening is oriented perpendicular to a longitudinal axis of said primary enclosure;
- at least one extendable enclosure having side panels, a front panel, a top panel, and a substantially open bottom;
- wherein said at least one extendable enclosure extends from a substantial perimeter of said side opening of said primary enclosure and is movably connected with respect to said primary enclosure;
- wherein said at least one extendable enclosure is adapted to move between a retracted position and an extended position;
- wherein said front panel is proximally spaced to said side opening in said retracted position and wherein said front panel is distally spaced from said side opening in said extended position to form a second interior space within said at least one extendable enclosure;
- wherein said second interior space is adapted to substantially enclose one or more ice angling holes and wherein said second interior space is connected to said first interior space through said side opening;
- wherein said at least one extendable enclosure includes a door operatively connected to said front panel;
- wherein said top panel includes a lip formed along an inner edge for sealing said side opening when said at least one extendable enclosure is positioned in said extended position;
- wherein said base includes a first runner, a second runner, and a raised center portion formed therebetween and extending parallel to said longitudinal axis of said primary enclosure;
- one or more seats affixed to said raised center portion;
- wherein said first runner and said second runner define a first lower space positioned below said at least one seat and above said first runner within said first interior space and a second lower space positioned below said at least one seat and above said second runner within said first interior space;
- wherein said first runner and said second runner each have at least one channel extending longitudinally thereal ong;
- an attachment structure having a base portion and a tow hitch portion, wherein said base portion is positioned within said at least one channel of said first runner and said second runner;
- wherein said tow hitch portion extends from a front of said base portion; and
- a slide member attached to said base portion opposite said base.

* * * * *